(12) United States Patent
Yen et al.

(10) Patent No.: US 8,178,288 B2
(45) Date of Patent: May 15, 2012

(54) METHOD FOR FABRICATING DISPLAY SUBSTRATE AND LIQUID CRYSTAL DISPLAY

(75) Inventors: Ze-Yu Yen, Taipei (TW); Ding-Jen Chen, Chiayi County (TW); Ya-Ting Wu, Yilan County (TW); Jian-Lung Chen, Taoyuan County (TW)

(73) Assignees: Taiwan TFT LCD Association, Hsinchu (TW); Chunghwa Picture Tubes, Ltd., Taoyuan (TW); Au Optronics Corporation, Hsinchu (TW); Hannstar Display Corporation, New Taipei (TW); Chi Mei Optoelectronics Corporation, Tainan County (TW); Industrial Technology Research Institute, Hsinchu (TW); TPO Displays Corp., Miao-Li County (TW)

( * ) Notice: Subject to any disclaimer, the term of this patent is extended or adjusted under 35 U.S.C. 154(b) by 967 days.

(21) Appl. No.: 12/176,413

(22) Filed: Jul. 21, 2008

(65) Prior Publication Data
US 2009/0226629 A1 Sep. 10, 2009

(30) Foreign Application Priority Data
Mar. 6, 2008 (TW) .............................. 97107852 A

(51) Int. Cl.
*G03F 1/1337* (2006.01)

(52) U.S. Cl. ........................................ 430/321; 349/129
(58) Field of Classification Search .................. None
See application file for complete search history.

(56) References Cited

U.S. PATENT DOCUMENTS

| 5,478,682 | A | * | 12/1995 | Nishikawa et al. ............. 430/20 |
| 5,909,265 | A | | 6/1999 | Kim et al. |
| 6,081,313 | A | * | 6/2000 | Kim ............................... 349/129 |
| 6,128,058 | A | * | 10/2000 | Walton .......................... 349/129 |
| 6,852,374 | B2 | | 2/2005 | Mizusaki et al. |
| 7,060,420 | B2 | | 6/2006 | Fan et al. |
| 2004/0241319 | A1 | | 12/2004 | Sa et al. |
| 2005/0078249 | A1 | | 4/2005 | Fan et al. |
| 2005/0260334 | A1 | | 11/2005 | Kwok et al. |
| 2007/0154657 | A1 | | 7/2007 | Sha et al. |

FOREIGN PATENT DOCUMENTS
TW 533324 5/2003

* cited by examiner

*Primary Examiner* — John A. McPherson
(74) *Attorney, Agent, or Firm* — Jianq Chyun IP Office

(57) ABSTRACT

A method for fabricating a display substrate is provided. A substrate is provided first. After that, an alignment film coating and an alignment treatment are performed to the substrate, and a layer of photoreactive monomer material is coated on the surface of the substrate after the alignment treatment. Thereafter, the layer of photoreactive monomer material is selectively irradiated by UV light in an exposed region, and the layer of photoreactive monomer material in an unexposed region is removed for liquid crystal molecules to have different pretilt angles in the exposed region and the unexposed region.

28 Claims, 6 Drawing Sheets

METHOD FOR FABRICATING DISPLAY SUBSTRATE AND LIQUID CRYSTAL DISPLAY

CROSS-REFERENCE TO RELATED APPLICATION

This application claims the priority benefit of Taiwan application serial no. 97107852, filed on Mar. 6, 2008. The entirety of the above-mentioned patent application is hereby incorporated by reference herein and made a part of this specification.

BACKGROUND

1. Field of Invention

The present invention relates to a method for fabrication a display substrate and a liquid crystal display, wherein the fabrication process is simple, reliable and economical.

2. Description of Related Art

In order to accommodate the demands for multi-domain alignment, transflective type alignment or high pretilt angle alignment, the liquid crystal alignment effects having different pretilt angles in the different regions is continuous studied by researchers in the field of liquid crystal display. A typical approach to alter the pretilt angle of the alignment surface is irradiated by the UV light, as disclosed in U.S. Pat. No. 6,852,374 B2 and U.S. Pat. No. 5,909,265; or the application of rubbing orientation to form the vertical-horizontal alignment intersection region, as disclosed in U.S. Pat. No. 7,060,420 B2. Other approaches include the fabrication of groove-like structures on a surface using photolithograph and etching techniques, followed by injecting different polyimide (PI) materials into groove-like structures to form a different alignment effect, as disclosed in US Patent Publication 2007/0154657 A1, or using a mixture of polyimide materials to generate the similar effect as disclosed in US Patent Publication 2005/0260334. However, these methods are usually time consuming, and the processes are difficult to control.

SUMMARY OF THE INVENTION

The present invention is to provide a method for fabricating a display substrate, wherein the liquid crystal molecules have different pretilt angles at the surface of the substrate at different regions.

The present invention is to provide a method for fabricating a liquid crystal display, in which liquid crystal molecules having different pretilt angles are formed at different regions, and the method is simple and economical, and is achievable with the commercial instruments.

The present invention is to provide a method for fabricating a display substrate, wherein a substrate is provided and an alignment film is coated on the substrate. Then, a photoreactive monomer material layer is coated on the alignment film. An UV light irradiation is selectively performed on the photoreactive monomer material layer in a first region. The photoreactive monomer material layer in a second region is then removed to appear a part of the alignment film in the second region. Moreover, an alignment treatment may be performed on the alignment film after the coating of the alignment thin film and before the coating of the photoreactive monomer material layer; optionally, the alignment treatment may be performed on the alignment thin film in the second region and the photoreactive monomer material layer in the first region after the removal of the photoreactive monomer material layer in the second region, such that a liquid crystal alignment effect of having different pretilt angles at the surfaces of the first region and the second region is formed.

The present invention further provides a method for fabricating a liquid crystal display, and the method includes providing a first substrate and a second substrate, and the following process steps are performed on at least one of the two substrates: performing an alignment treatment on the alignment thin film, coating a layer of photoreactive monomer material on the alignment film, followed by selectively performing an UV light irradiation on the photoreactive monomer material layer in a first region and removing the photoreactive monomer material layer in a second region. Moreover, an alignment treatment is performed on the alignment film subsequent to coating of the alignment thin film and prior to the coating of the reactive single monomer material layer; or an alignment treatment is performed on the alignment thin film and the photoreactive monomer material layer in the first region after the removal of the photoreactive monomer material layer in the second region for liquid crystal molecules to have different pretilt angles at the surfaces of the first region and the second region. Thereafter, the first substrate and the second substrate are assembled together face-to-face, and a liquid crystal layer is further provided between the first and the second substrates.

The present invention relies on the technique of coating a photoreactive monomer material layer on an alignment treated substrate, performing an exposure process for the photoreactive monomer material layer in an exposed region to undergo a reaction, and a removal of the photoreactive monomer material layer in the unexposed region to generate the effect of liquid crystal molecules having different pretilt angles at the surfaces of the exposed region and the unexposed region. Hence, the fabrication method of the present invention is easy, and the efficiency is better.

In order to make the aforementioned and other objects, features and advantages of the present invention comprehensible, a preferred embodiment accompanied with figures is described in detail below.

DESCRIPTION OF EMBODIMENTS

The present invention now will be described more fully hereinafter with reference to the accompanying drawings, in which preferred embodiments of the invention are shown. This invention could, however, be embodied in many different forms and should not be construed as limited to the embodiments set forth herein; rather, these embodiments are provided so that this disclosure will be thorough and complete, and will fully convey the scope of the invention to those skilled in the art.

FIGS. 1A to 1D are schematic, cross-sectional views showing selected steps of the fabrication of a display substrate according to a first embodiment of the present invention.

Figure 1A:
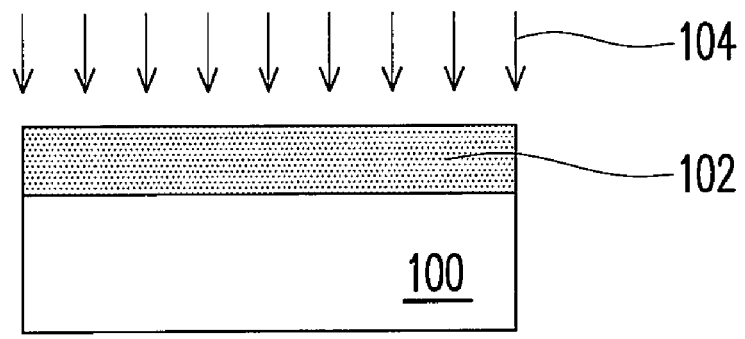
FIGS. 1A to 1D are schematic, cross-sectional views showing selected steps for the fabrication of a display substrate according to an embodiment of the present invention.

Referring to FIG. 1A, a piece of substrate 100 is provided, wherein the material of the substrate 100 may include glass, quartz, plastic, a silicon material or other materials that are appropriate as a substrate material of a display device. An alignment film 102 is coated on the substrate 100. The above alignment film 102 can be an organic film or an inorganic film, wherein an organic film includes, but not limited to, polyimide, polyamic acid (PAA), polyamide, polyvinyl alcohol, polyvinyl cinnamate (PVCi) or other types of high molecular weight thin films, while the inorganic film may include diamond-like carbon (DLC), indium titanium oxide (ITO), silicon oxide ($SiO_x$) or silicon nitride ($SiN_x$). Other types of organic films or inorganic films that are well known to those skilled in the field of the invention may be used as the alignment thin film 102. Then, an alignment treatment 104 is performed on the alignment film 102, wherein the alignment treatment includes, ion beam alignment, UV alignment, plasma alignment, oblique evaporation method, or rubbing for the substrate 100 surface to become anisotropic.

Figure 1B:
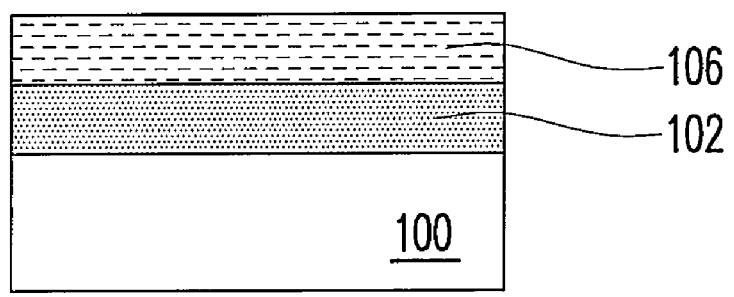

Thereafter, referring to FIG. 1B, the substrate 100 surface, after being subjected to an alignment treatment, is coated with a layer of photoreactive monomer material 106. The coating method of the photoreactive monomer material layer 106 includes spin coating, screen printing, offset printing, ink-jet printing and nano-imprinting, etc. The photoreactive monomer material 106 includes, for example, reactive liquid crystal monomer, positive photoresist material or negative photoresist material. In addition, the application of the photoreactive monomer material layer 106 in the display device, the liquid crystal molecules can be horizontally aligned or vertically aligned. For example, when the above alignment treated alignment thin film 102 is horizontally aligned (in other words, the angle range is between 0 to 20 degrees), a vertical type of the photoreactive monomer material layer is selected. However, when the above alignment layer 102 is vertically aligned (the angle range is between 70 to 90 degrees), a horizontal type of the photoreactive monomer material layer is preferred.

Figure 1C:
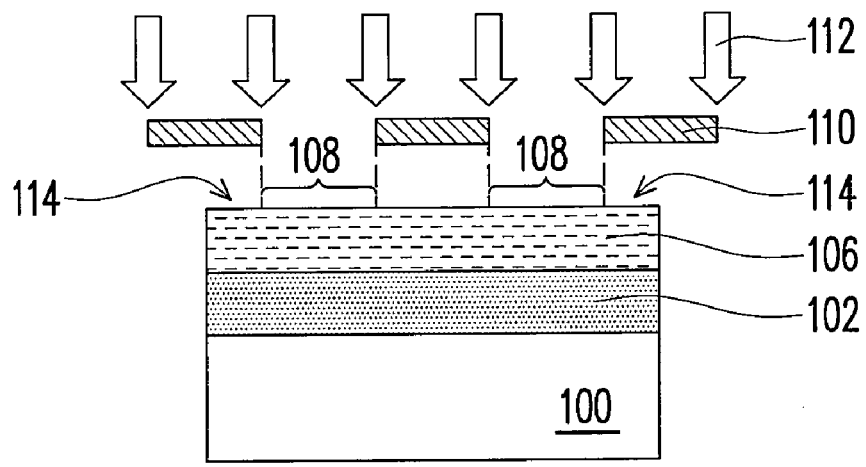

Then, as shown in FIG. 1C, the photoreactive monomer material layer 106 in an exposed region 108 is selectively irradiated by UV light. As shown in FIG. 1C, using a patterned photomask 110, an exposure is conducted using UV light 112 to cure the photoreactive monomer material layer 106 in exposed region 108. The photoreactive monomer material layer 106 in the unexposed region 114 maintains its original material characteristic.

Figure 1D:
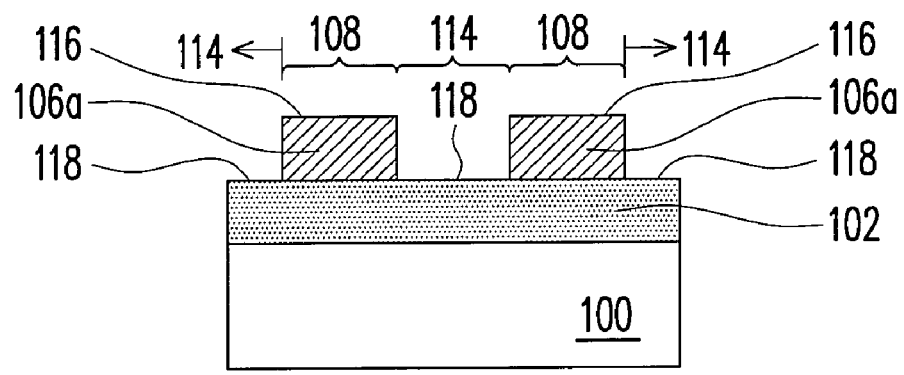

Thereafter, as shown in FIG. 1D, the photoreactive monomer material layer 106 (not shown) in the unexposed region 114 is removed, and the surface of the photoreactive monomer material layer 106a in the expose region and the surface 118 of the alignment thin film 102 in the unexposed region 114 generate the effects of liquid crystal alignment with different pretilt angles. The method of removing of the photoreactive monomer material layer 106 in the unexposed region 114 includes a cleaning process with water, ethanol, isopropyl alcohol, acetone, methyl ethyl ketone (MEK), development liquids or other appropriate solvents.

Since the display substrate fabricated according to the first embodiment can replace one or all of the substrates in a displace device, a certain region of the displace substrate of the first embodiment can form the vertically-arranged (VA) or horizontally-arranged liquid crystal alignment. Moreover, the differences in the alignment between the top and the bottom substrates are used to generate a hybrid aligned nematic (HAN) liquid crystal alignment.

FIGS. 2A to 2D are schematic, cross-sectional views showing selected steps of the fabrication of a display substrate according to a second embodiment of the present invention. Like numbers refer to like elements in both embodiments.

Figure 2A:
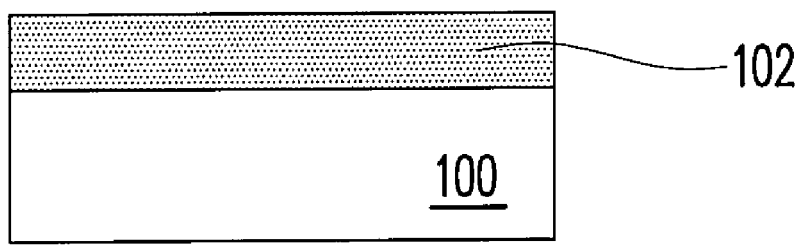
FIGS. 2A to 2D are schematic, cross-sectional views showing selected steps for the fabrication of a display substrate according to a second embodiment of the present invention.

As shown in FIG. 2A, a substrate 100 is provided, and an alignment thin film 102 is coated on the substrate 100.

Figure 2B:
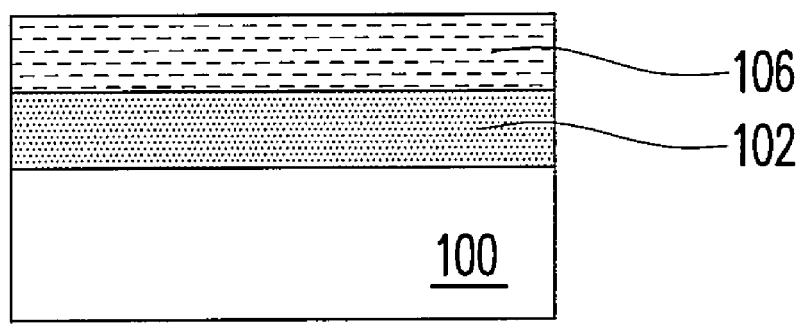

Continuing to FIG. 2B, the substrate 100 surface coated with the alignment film is further coated with a photoreactive monomer material layer 106.

Figure 2C:
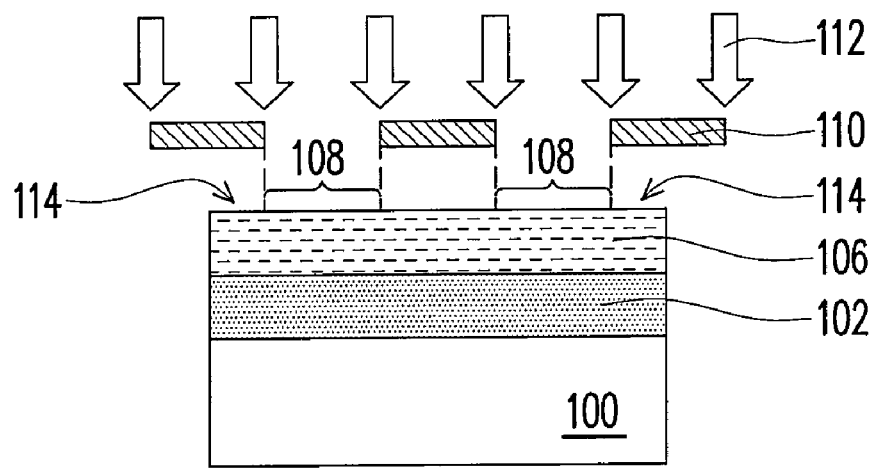

Referring to FIG. 2C, the photoreactive monomer material layer 106 in an exposed region 108 is being selectively irradiated with UV light. Similar to the first embodiment, a patterned photomask 110 may be used to perform the exposure process with UV light 112 to cure the photoreactive monomer material layer 106 in the exposed region 108, while the photoreactive monomer material layer 106 in the unexposed region 114 retains its original material characteristics.

Figure 2D:
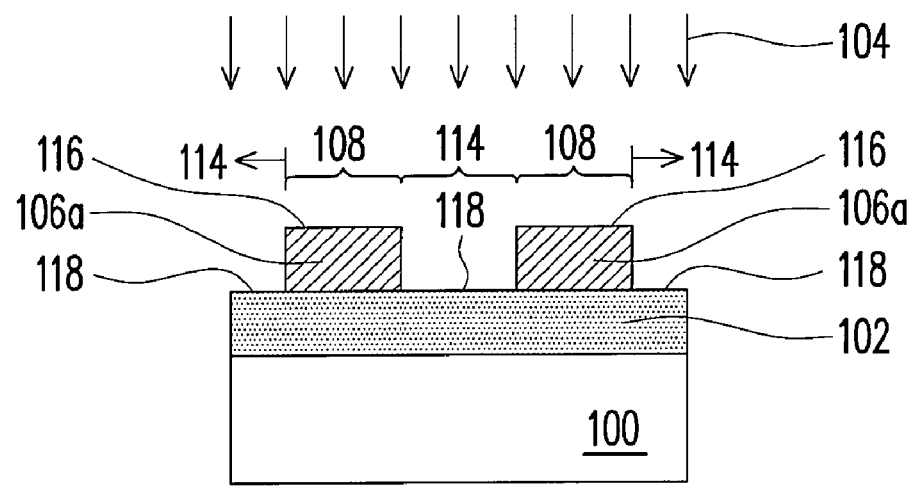

Referring to FIG. 2D, the photoreactive monomer material layer 106 in the unexposed region 114 (not shown) is then removed. An alignment treatment is then performed on the alignment thin film 102 and the exposed photoreactive monomer material layer 106a to generate the liquid crystal alignment effect with different pretilt angles.

The materials of the various layers and the fabrication process of the second embodiment are similar to those described in the first embodiment, and thus will not be further discussed herein.

Figure 3:
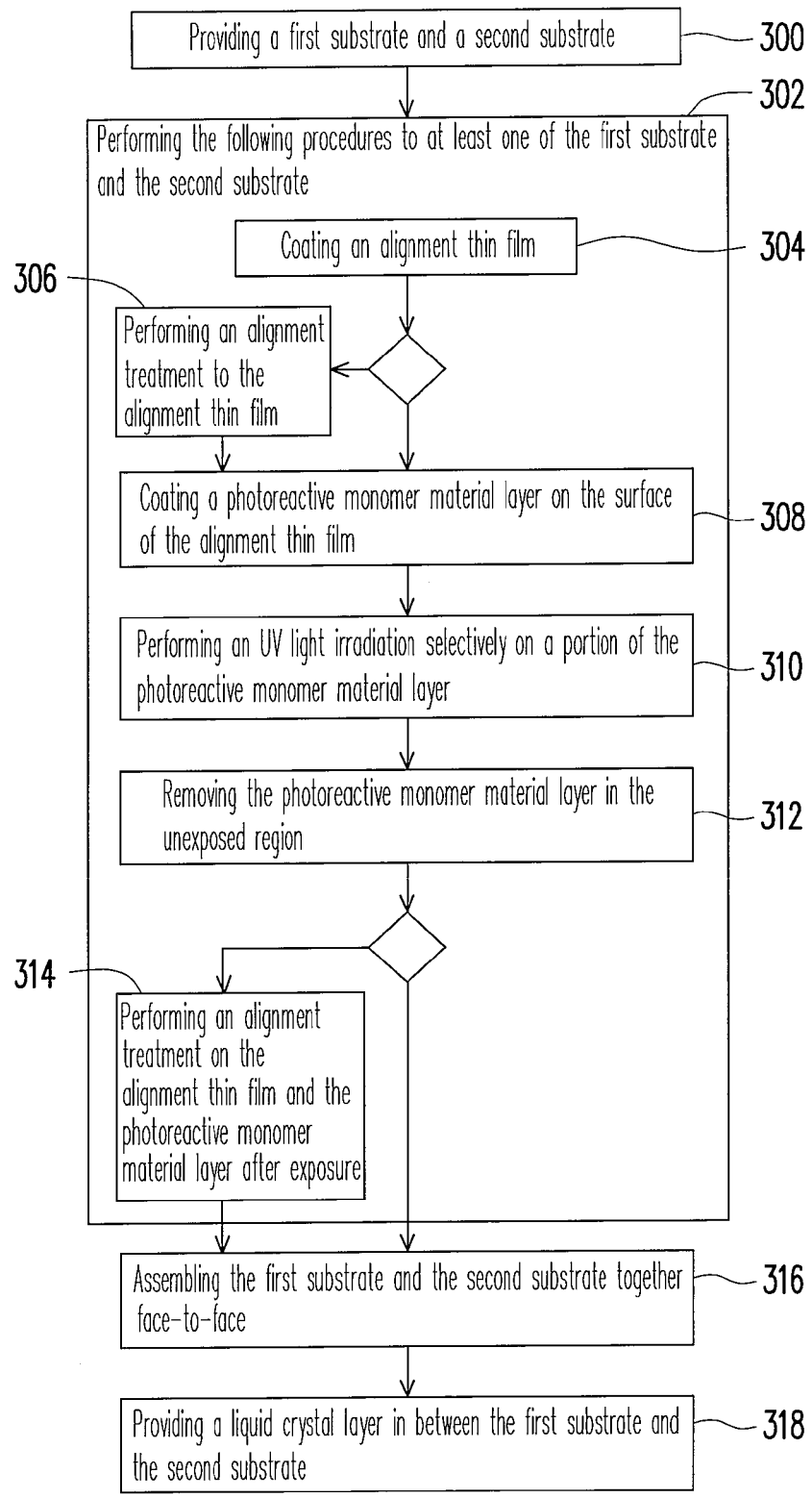
FIG. 3 is a flow diagram showing selective process steps in the fabrication of a liquid crystal display according to the invention.

FIG. 3 is a flow diagram showing selective process steps in the fabrication of a liquid crystal display according to the invention. The liquid crystal display includes, but not limited to, TN (twisted nematic) liquid crystal panel, an IPS (in-plane switching) liquid crystal panel, a VA (vertically aligned) liquid crystal panel, a pi-cell liquid crystal panel, a negative pi-cell liquid crystal panel or a splay bend device (SBD) liquid crystal panel, or a bistable twisted nematic (BTN) liquid crystal panel.

Referring to FIG. 3, in Step 300, a first substrate and a second substrate are provided, wherein the materials of the two substrates may be the same or different.

Then, Step 302 is performed, in which the following steps 304 to 314 are performed on at least one of the first substrate and the second substrate.

Step 304: Coating an alignment thin film. The alignment thin film may include polyimide, polyamic acid (PAA), polyamide, polyvinyl alcohol, polyvinyl cinnamate (PVCi) or other types of high molecular weight organic thin film, or inorganic thin film, such as, diamond-like carbon (DLC), indium titanium oxide (ITO), silicon oxide ($SiO_x$) or silicon nitride ($SiN_x$).

Then, step 306 is optionally performed or step 308 is directly performed. In step 306, an alignment treatment is performed on the alignment thin film, wherein the alignment treatment includes, but not limited to, ion beam alignment, UV alignment, plasma alignment, oblique evaporation method, or rubbing. In step 308, a photoreactive monomer material layer is coated on the surface of the alignment thin film, wherein the thickness of the photoreactive monomer material layer is between about 50 angstroms to about 2000 angstroms, and a method of coating the photoreactive monomer material layer includes, spin coating, screen printing, offset printing, ink-jet printing or nano-imprinting, etc. The photoreactive monomer material layer 106 may include a reactive liquid crystal monomer layer, a positive photoresist material layer or a negative photoresist material layer, and the above-mentioned photoreactive monomer material layer 106 allows the liquid crystal molecules to have the characteristics of being horizontally arranged or vertically arranged.

Step 310: Performing an UV light irradiation selectively on a portion of the photoreactive monomer material layer. When the photoreactive monomer material layer is a reactive liquid crystal monomer layer, the photoreactive monomer material layer in the exposed region is polymerized into a liquid crystal polymer (LCP).

Step 312: Removing the photoreactive monomer material layer in the unexposed region, using solvents such as, water, ethanol, isopropyl alcohol, acetone, methyl ethyl ketone (MEK), development liquids, etc.

If step 306 has not been conducted prior to the performance of step 308, step 314 is performed, wherein Step 314: Performing an alignment treatment on the alignment film in the unexposed region and the photoreactive monomer material layer in the exposed region for liquid crystal molecules to have different pretilt angles in the surfaces of the exposed region and the unexposed region.

Subsequent to Step 310, step 316 is performed wherein the first substrate and the second substrate are face-to-face assembled together, and the method of assembling the substrate includes the conventional spacer spraying and sealant dispensing.

In step 318, a liquid crystal layer is provided between the first substrate and the second substrate.

The fabrication method in the third embodiment of the invention is applicable in the fabrication of display device with a high pretilt angle characteristic or a display device with a transflective characteristic.

Table 1 summarizes the electrical characteristics measurement results, wherein the voltage holding ratio (VHR) and the residual direct current (RDC) of a liquid crystal display fabricated according the fabrication process of the third embodiment of the invention are reported. In these measurements, the photoreactive monomer material layer used in Step 308 is a reactive liquid crystal monomer layer with a thickness of about 100 angstroms. In step 312, MEK is used to remove the unexposed photoreactive monomer.

TABLE 1

|  | VHR (%) (V) | RDC (mV) Final |
|---|---|---|
| Sample 1 | 99.12 | 174.6 |
| Sample 2 | 99.01 | 179 |

The results of the different samples are obtained under the same measurement conditions, and the results in Table 1 indicate that the electrical characteristic of the liquid crystal display fabricated according to the third embodiment of the invention can maintain VHR>99%, RDC<200 mV.

Figure 4:
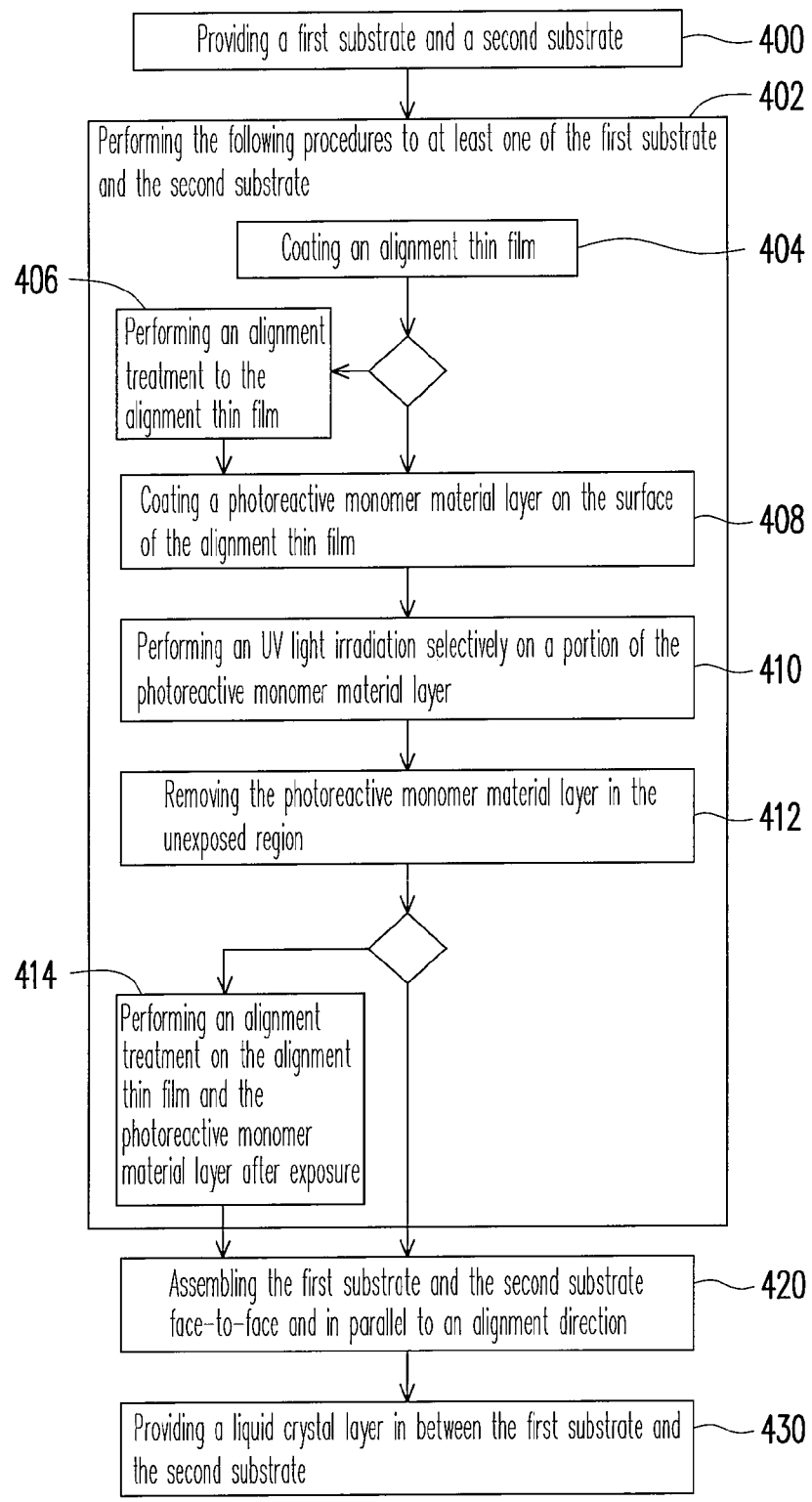
FIG. 4 is a flow diagram showing selective process steps in the fabrication of a high pretilt angle of optically compensated bend (OCB) liquid crystal display according to fourth embodiment of the invention.

FIG. 4 is a flow diagram showing selective process steps in the fabrication of an optically compensated bend (OCB) liquid crystal display with a high pretilt angle according to fourth embodiment of the invention.

Referring to FIG. 4, in step 400, a first substrate and a second substrate are provided, wherein the materials of the first substrate and the second substrate may be the same or different, as in embodiment 1.

Thereafter, in step 402, the following process steps 404 to 414 are performed on at least one of the first substrate and the second substrate:

Step 404: Coating an alignment film. A material of the alignment thin film may include polyimide, polyamic acid (PAA), polyamide, polyvinyl alcohol, polyvinyl cinnamate (PVCi) or other types of high molecular weight organic thin film organic films or inorganic films such as, diamond-like carbon (DLC), indium titanium oxide (ITO), silicon oxide ($SiO_x$) or silicon nitride ($SiN_x$).

Then, Step 406 is optionally performed or Step 408 is directly performed. Step 406 includes an alignment treatment conducted on the alignment film, wherein the alignment treatment includes ion beam alignment, UV alignment, plasma alignment, oblique evaporation method, or rubbing. Step 408 includes coating a photoreactive monomer material layer on the surface of the alignment thin film, wherein the photoreactive monomer material layer is about 1000 angstroms thick, and the method of coating the photoreactive monomer material layer includes spin coating, screen printing, offset printing, ink-jet printing or nano-imprinting, etc. Moreover, the material of the photoreactive monomer material layer may include a reactive liquid crystal monomer layer, a positive photoresist material layer or a negative photoresist material layer, and the above-mentioned photoreactive monomer material layer allows the liquid crystals to have the characteristics of being horizontally arranged or vertically arranged.

Step 410: Performing an UV light irradiation selectively on the photoreactive monomer material layer in an exposed region, wherein when the photoreactive monomer material layer is a reactive liquid crystal monomer layer, the photoreactive monomer material layer in the exposed region is polymerized into a liquid crystal polymer (LCP).

Step 412: Removing the photoreactive monomer material layer in the unexposed region, using solvents such as, water, ethanol, isopropyl alcohol, acetone, MEK, development liquids, etc.

If Step 406 has not been conducted prior to the performance of Step 408, Step 414 is performed, wherein Step 414: Performing an alignment treatment on the alignment film in the unexposed region and the photoreactive monomer material layer in the exposed region to generate the effect of liquid crystal molecules having different pretilt angles in the surfaces of the exposed region and the unexposed region.

Subsequent to Step 410, Step 420 is performed wherein the first substrate and the second substrate are assembled face-to-face and in parallel to an alignment direction. The method of assembling the substrate includes the conventional spacer spraying and sealant dispensing, for example.

In step 430, a liquid crystal layer is provided between the first substrate and the second substrate.

According to the present invention, a surface is treated by a single alignment treatment process and a photoreactive monomer material layer is formed thereon. Then, an exposure process is performed with an existing UV exposure machine for the monomer material in the exposed region to react, followed by removing the monomer material in the unexposed region. The liquid crystal alignment effect with liquid crystal molecules having different pretilt angles at the surfaces of the exposed region of the photoreactive monomer material layer and the unexposed region of the alignment treated surface is thereby provided. Further, the size of the alignment region with different pretilt angles can be quantitatively controlled by the photomask. Hence, the process is easy and the efficiency is better.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A fabrication method of a display substrate, the method comprising:
   providing a substrate;
   coating an alignment thin film on the substrate;
   coating a photoreactive monomer material layer on the alignment thin film;
   performing an UV light irradiation selectively on the photoreactive monomer material layer in a first region;
   removing the photoreactive monomer material layer in a second region to appear a part of the alignment thin film, wherein the second region is not exposed in the UV light irradiation; and
   performing an alignment treatment process on the exposed alignment film in the second region and the UV light irradiated photoreactive monomer material layer in the first region for liquid crystal molecules to have different pretilt angles in the first region and the second region.

2. The fabrication method of claim 1, wherein the step of coating the photoreactive monomer material layer includes a step of coating a reactive liquid crystal monomer material or a negative photoresist material.

3. The fabrication method of claim 1, wherein the step of performing the alignment treatment process comprises a step of performing an ion beam alignment process, an UV alignment process, a plasma alignment process, an oblique evaporation process or a rubbing process.

4. The fabrication method of claim 1, wherein the alignment thin film comprises an organic film.

5. The fabrication method of claim 4, wherein a material of the organic film includes at least one of polyimide, polyamic acid (PAA), polyamide, polyvinyl alcohol and polyvinyl cinnamate (PVCi).

6. The fabrication method of claim 1, wherein the alignment thin film comprises an inorganic film.

7. The fabrication method of claim 6, wherein a material of the inorganic film comprises at least one of diamond-like carbon (DLC), indium titanium oxide (ITO), silicon oxide ($SiO_x$) and silicon nitride ($SiN_x$).

8. The fabrication method of claim 1, wherein a method used in coating the photoreactive monomer material includes spin coating, screen printing, offset printing, ink-jet printing or nano-imprinting.

9. The fabrication method of claim 1, wherein a method used in removing photoreactive monomer material layer in the second region comprises at least a step of cleaning with water, ethanol, isopropyl alcohol, acetone, MEK or development liquid.

10. A method for fabricating a liquid crystal display, the method comprising:
    a). providing a first substrate and a second substrate;
    b). performing following process steps to at least one of the first substrate and the second substrate:
       coating an alignment thin film on at least one of the first substrate and the second substrate;
       coating a photoreactive monomer material layer on the alignment thin film;
       performing an UV light irradiation selectively on the photoreactive monomer material layer in a first region;
       removing the photoreactive monomer material layer in a second region to expose a part of the alignment thin film, wherein the second region is not exposed in the UV light irradiation; and
       performing an alignment treatment process on the exposed part of the alignment film in the second region and the UV light irradiated photoreactive monomer material layer in the first region;
    c). assembling the first substrate and the second substrate in a face-to-face configuration; and
    d). providing a liquid crystal layer between the first substrate and the second substrate.

11. The method of claim 10, wherein the step of coating the photoreactive monomer material layer includes a step of coating a reactive liquid crystal monomer material or a negative photoresist material.

12. The method of claim 10, wherein the step of performing the alignment treatment process includes a step of performing an ion beam alignment process, an UV alignment process, a plasma alignment process, an oblique evaporation process or a rubbing process.

13. The method of claim 10, wherein the alignment thin film comprises an organic thin film.

14. The method of claim 13, wherein the organic thin film includes high molecular weight thin film having a material comprising at least one of polyimide, polyamic acid (PAA), polyamide, polyvinyl alcohol, polyvinyl cinnamate (PVCi).

15. The method of claim 10, wherein the alignment thin film comprises an inorganic thin film.

16. The method of claim 15, wherein a material of the inorganic film comprises at least one of diamond-like carbon (DLC), indium titanium oxide (ITO), silicon oxide ($SiO_x$) or silicon nitride ($SiN_x$).

17. The method of claim 10, wherein the photoreactive monomer material allows liquid crystal molecules to be horizontally arranged or vertically arranged.

18. The method of claim 10, wherein a method used in coating the photoreactive monomer material includes spin coating, screen printing, offset printing, ink-jet printing or nano-imprinting.

19. The method of claim 10, wherein a method used in removing photoreactive monomer material layer in the second region comprises at least a step of removal with water, ethanol, isopropyl alcohol, acetone, methyl ethyl ketone or development liquid.

20. The method of claim 10, wherein the photoreactive monomer material layer has a thickness of about 50 to about 2000 angstroms.

21. The method of claim 10, wherein the step c) further comprises assembling the first substrate and the second substrate in a face-to-face configuration and an alignment direction is in a horizontal configuration.

22. The method of claim 10, wherein the liquid crystal display is a twisted nematic (TN) liquid crystal panel.

23. The method of claim 10, wherein the liquid crystal display is an in-plane switching (IPS) liquid crystal panel.

24. The method of claim 10, wherein the liquid crystal display is a vertically aligned (VA) liquid crystal panel.

25. The method of claim 10, wherein the liquid crystal display is a pi-cell liquid crystal panel.

26. The method of claim 10, wherein the liquid crystal display is a negative pi-cell liquid crystal panel.

27. The method of claim 10, wherein the liquid crystal display is a splay bend device (SBD) liquid crystal panel.

28. The method of claim 10, wherein the liquid crystal display is a bistable twisted nematic (BTN) liquid crystal panel.

* * * * *